United States Patent
Hayasaka

(10) Patent No.: US 6,838,851 B2
(45) Date of Patent: Jan. 4, 2005

(54) INNER-FORCE PROVIDING INPUT DEVICE HAVING A POWER-OPERATED ACTUATOR FOR GENERATING A CLICK FEEL

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/664,770

(22) Filed: Sep. 17, 2003

(65) Prior Publication Data
US 2004/0056624 A1 Mar. 25, 2004

(30) Foreign Application Priority Data
Sep. 25, 2002 (JP) ........................................ 2002-279101

(51) Int. Cl.[7] ............................................... G05B 13/00
(52) U.S. Cl. ........................ 318/561; 318/432; 318/434; 318/562; 360/14.1; 360/14.3; 188/267.1; 335/253; 345/156; 345/184
(58) Field of Search ................................. 318/430–439, 318/560–569, 630–632; 360/14.1, 14.3; 188/267.1, 267.2; 345/156, 184

(56) References Cited

U.S. PATENT DOCUMENTS

| | | | | |
|---|---|---|---|---|
| 4,402,246 A | * | 9/1983 | Sekiguchi | 84/622 |
| 5,220,260 A | * | 6/1993 | Schuler | 318/561 |
| 5,381,080 A | * | 1/1995 | Schnell et al. | 318/566 |
| 5,944,151 A | * | 8/1999 | Jakobs et al. | 188/267.1 |
| 6,154,201 A | * | 11/2000 | Levin et al. | 345/184 |
| 6,278,439 B1 | | 8/2001 | Rosenberg et al. | |
| 6,636,197 B1 | * | 10/2003 | Goldenberg et al. | 345/156 |
| 6,686,911 B1 | * | 2/2004 | Levin et al. | 345/184 |
| 2004/0032395 A1 | * | 2/2004 | Goldenberg et al. | 345/156 |
| 2004/0100440 A1 | * | 5/2004 | Levin et al. | 345/156 |

* cited by examiner

*Primary Examiner*—Paul Ip
(74) *Attorney, Agent, or Firm*—Brinks Hofer Gilson & Lione

(57) ABSTRACT

Under electric control of a motor by a CPU, before the rotation angle of a rotary knob reaches a predetermined angle (20°, 40°, 60°, . . . 360°), a torque in the same direction as a rotational direction is provided from the motor to the rotary knob, and the torque is decreased from a maximum value to zero. When the rotation angle of the rotary knob reaches a predetermined angle, a torque product is provided to the rotary knob depending upon an angular velocity of the rotary knob. After the rotation angle of the rotary knob exceeds a predetermined rotation angle, a torque in the reverse direction to a rotational direction is provided to the rotary knob, and the torque is increased from zero to a maximum value.

4 Claims, 4 Drawing Sheets

INNER-FORCE PROVIDING INPUT DEVICE HAVING A POWER-OPERATED ACTUATOR FOR GENERATING A CLICK FEEL

BACKGROUND OF THE INVENTION

1. Field of the Invention

The present invention relates to an inner-force providing input device adapted to generate a click feel on an operating member to be manually operated.

2. Description of the Related Art

Conventionally, there are mechanical input devices adapted to generate a click feel on the operating member by the click mechanism. However, there is no inner-force providing input device having a power-operated actuator to deliver a torque to the operating member under electric control thereby generating a click feel thereon. Realizing such an inner-force providing input device has been desired.

In this situation, the present inventor has developed to the present invention in an attempt to meet the foregoing demand, and made the following test product in the development stage of the invention.

The inner-force providing input device trial-made in the development stage of the invention has an operating member to be manually rotated, e.g. rotary knob, a power-operated actuator for delivering a torque to the operating member, e.g. motor, rotation-angle detecting means such as an encoder or potentiometer to detect a rotation angle of the operating member, control means for controlling the motor depending upon a rotation angle of the operating member detected by the rotation-angle detecting means, i.e. a CPU.

The CPU is set such that, during rotation of the rotary knob from a predetermined first angle to a predetermined third angle beyond a predetermined second angle, when the rotary knob is within a range of from the first angle to the second angle, a torque in the same direction as the rotation direction of the rotary knob is delivered from the power-operated actuator to the rotary knob and decreased with an increase in rotation angle of the rotary knob. Incidentally, the maximum value of torque to be provided to the rotary knob is previously set depending upon the motor performance.

Meanwhile, the CPU is set such that, during rotation of the rotary knob from the predetermined first angle to the predetermined third angle beyond the predetermined second angle as in the above, when the rotary knob is within a range of from the second angle to the third angle, a torque in the reverse direction to the rotation direction of the rotary knob is delivered to the rotary knob and increased with an increase in rotation angle of the rotary knob.

The test product of inner-force providing input device thus constructed operates as in the following.

It is assumed that the operator grips the rotary knob and rotates it to the third angle for example. During rotation of the rotary knob, the rotation angle of the rotary knob is continuously detected by the rotation-angle detecting means. During rotation of the rotary knob from the first angle to the second angle, a torque in the same direction as the rotational direction is delivered from the motor to the rotary knob under control of the motor by the CPU. This torque decreases with an increase in rotation angle. Due to this, the operator can have a feel sensation that, during rotation of the rotary knob from the first angle to the second angle, an urging force is delivered to the rotary knob whereby the urging force gradually decreases with rotation of the rotary knob.

Then, during rotation of the rotary knob from the second angle to the third angle, a torque in the reverse direction to the rotational direction is provided from the motor to the rotary knob under control of the motor by the CPU. This torque increases with an increase in rotation angle of the rotary knob. Due to this, the operator can have a feel sensation that, during rotation of the rotary knob from the second angle to the third angle, a resistance force is caused on the rotary knob whereby the resistance force gradually increases with rotation of the rotary knob.

Namely, the above test product of inner-force providing input device can generate a feel, similar to that of a click mechanism at around the time that the rotation angle of the rotary knob reaches the second angle. This can generate a click feel resembling that of a click mechanism when the second angle is exceeded by the rotation angle of the rotary knob.

Incidentally, concerning the prior art document information, in the present there is found no document disclosing a relevant description to the invention.

In the above test product of inner-force providing input device, a feel similar to that of a click mechanism is generated at around the rotation angle of the rotary knob reaches the second angle. Due to this, a click feel resembling that of a click mechanism can be caused when the rotation angle of the rotary knob surpasses the second angle. However, it is impossible to generate a clear click feel similar to a click feel as caused by a click mechanism.

The present invention has been made in consideration of the foregoing present situation, and it is an object thereof to provide an inner-force providing input device capable of generating a click feel similar to that of the click mechanism under electric control.

SUMMARY OF THE INVENTION

In order to achieve the foregoing object, an inner-force providing input device of the present invention comprises: an operating member to be manually rotated; a power-operated actuator for providing a torque to the operating member; rotation angle detecting means for detecting a rotation angle of the operating member; operating velocity detecting means for detecting an angular velocity of the operating member; and control means for controlling the power-operated actuator depending upon an rotation angle detected by the rotation angle detecting means and an angular velocity detected by the operating velocity detecting means; the control means being set such that, while the operating member rotates from a predetermined first angle to a predetermined third angle beyond a predetermined second angle, when the operating member is within a range of from the first angle to the second angle, a torque in a same direction as a rotating direction of the operating member is provided from the power-operated actuator to the operating member and decreased with an increase in rotation angle of the operating member, when the operating member reaches the second angle, a torque product based on an angular velocity of the operating member detected by the operating velocity detecting means is provided from the power-operated actuator to the operating member, and when the operating member is within a range of from the second angle to the third angle, a torque in a reverse direction to a rotating direction of the operating member is provided from the power-operated actuator to the operating member and increased with an increase in rotation angle of the operating member.

The present invention thus constructed operates as in the following.

It is assumed that the operator grips the operating member and rotates it to the third angle for example. During rotation of the operating member, the rotation angle of the operating member is continuously detected by the rotation-angle detecting means.

During rotation of the operating member from the first angle to the second angle, under control of the power-operated actuator by the control means, a torque in the same direction as the rotational direction is provided from the motor to the operating member. This torque decreases with an increase in rotation angle. Due to this, the operator can have a feel sensation that, during rotation of the operating member from the first angle to the second angle, an urging force is provided to the operating member whereby the urging force gradually decreases with rotation of the operating member.

Then, when the rotation angle of the operating member reaches the second angle, a torque product based on an angular velocity detected at this time by the operating velocity detecting means is provided from the power-operated actuator to the operating member. Due to this, the operator obtains an impact from the operating member when the rotation angle of the operating member exceeds the second angle.

Then, while the operating member rotates from the second angle to the third angle, under control of the power-operated actuator by the control means, a torque in a reverse direction to the rotating direction is provided from the power-operated actuator to the operating member. This torque increases with an increase in rotation angle of the operating member. Due to this, the operator has a feel sensation that, during rotation of the operating member from the second angle to the third angle, a resistance force is caused on the operating member whereby the resistance force gradually increases as the operating member is rotated.

Namely, in the invention, under electric control of the power-operated actuator, a feel similar to that of a click mechanism is generated at around the time the operating member reaches the second angle. In addition, when the operating member reaches the second angle, an impact similar to that of a click mechanism is generated, thus making it possible to generate a click feel similar to that of a click mechanism.

Meanwhile, in the foregoing invention, the operating velocity detecting means comprises the rotation angle detecting means and an operating velocity arithmetic operating section for arithmetically operating an angular velocity of the operating member on the basis of a rotation angle change of the operating member detected by the rotation angle detecting means, the operating velocity arithmetic operating section being included in the control means. The invention thus constructed can efficiently configure the control means.

Meanwhile, in the foregoing invention, the control means may include a torque product arithmetic operating section for arithmetically operating the torque product according to a product of the angular velocity arithmetically operated by the operation velocity arithmetic operating section and a preset proportional multiplier, to adjustably configure an upper limit value of torque of upon providing the torque product to the operating member and the proportional multiplier. The invention thus structured can change the click feel.

Meanwhile, in the above the inner-force providing input device has the operating member to be rotated manually. In the case to configure an inner-force providing input device having an operating member to be operated straight-line manually, it is satisfactory to configure such that a force in place of a torque and an impulse in place of a torque product are provided to the operating member.

Namely, the invention on an inner-force providing input device having an operating member to be operated straight-line manually comprises: an operating member to be manually operated straight-line; a power-operated actuator for providing a force to the operating member; position detecting means for detecting a position of the operating member; operating velocity detecting means for detecting a moving velocity of the operating member; and control means for controlling the power-operated actuator depending upon a position detected by the position detecting means and a moving velocity detected by the operating velocity detecting means; the control means being set such that, while the operating member moves from a predetermined first position to a predetermined third position beyond a predetermined second position, when the operating member is within a range of from the first position to the second position, a force in a same direction as a moving direction of the operating member is provided from the power-operated actuator to the operating member and decreased with an increase in moving distance of the operating member, when the operating member reaches the second position, an impulse based on a moving velocity of the operating member detected by the operating velocity detecting means is provided from the power-operated actuator to the operating member, and when the operating member is within a range of from the second position to the third position, a force in a reverse direction to a moving direction of the operating member is provided from the power-operated actuator to the operating member and increased with an increase in moving distance of the operating member.

The invention thus configured operates as in the following.

It is assumed that the operator grips the operating member and moves it to the third position for example. During movement of the operating member, the position of the operating member is continuously detected by the position detecting means.

During movement of the operating member from the first position to the second position, under control of the power-operated actuator by the control means, a force in the same direction as the moving direction is provided from the power-operated actuator to the operating member. This force decreases with an increase in moving distance. Due to this, the operator can have a feel sensation that, during movement of the operating member from the first position to the second position, an urging force is delivered to the operating member whereby the urging force gradually decreases with movement of the operating member.

Then, when the operating member reaches the second position, under control of the power-operated actuator by the control means, an impulse based on a moving velocity detected at this time by the operating velocity detecting means is provided from the power-operated actuator to the operating member. Due to this, the operator obtains an impact from the operating member when the operating member exceeds the second position.

Then, while the operating member moves from the second position to the third angle, under control of the power-operated actuator by the control means, a force in a reverse direction to the moving direction is provided from the power-operated actuator to the operating member. This force increases with an increase in moving distance of the operating member. Due to this, the operator has a feel sensation that, during movement of the operating member from the second position to the third position, a resistance force is caused on the operating member whereby the resistance force gradually increases as the operating member is moved.

Namely, in the invention, under electric control of the power-operated actuator, a feel similar to that of a click mechanism is generated at around the time the operating member reaching the second position. In addition, when the operating member reaches the second position, an impact similar to that of a click mechanism is generated. Accordingly, even in case the operating member is to be operated straight-line, a click feel can be generated that is similar to that to be obtained by a click mechanism.

DETAILED DESCRIPTION OF THE INVENTION

An embodiment of an inner-force providing input device of the present invention is explained with using the drawings.

Figure 1:
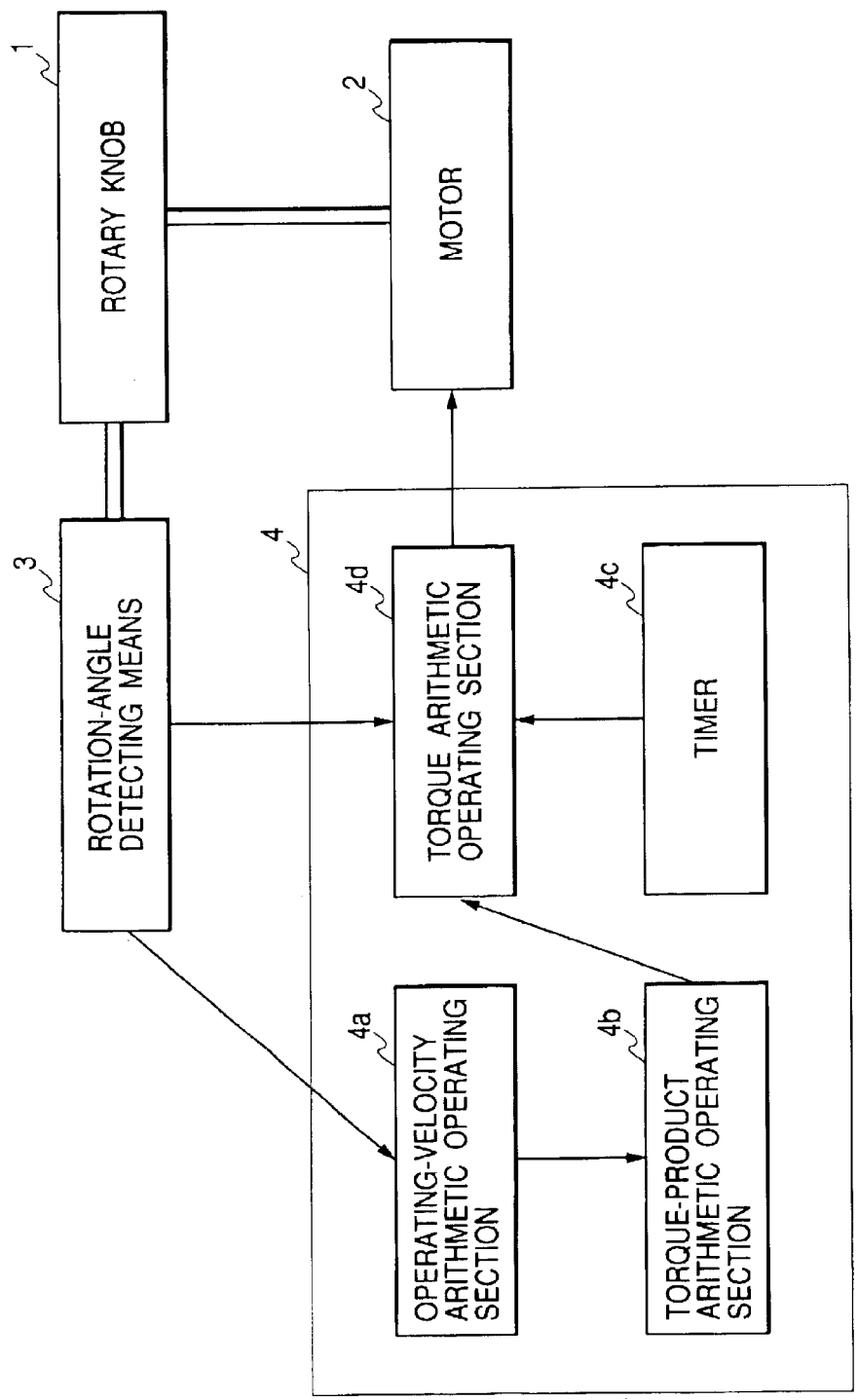
FIG. 1 is a block diagram showing a basic configuration of the present embodiment.
Figure 2:
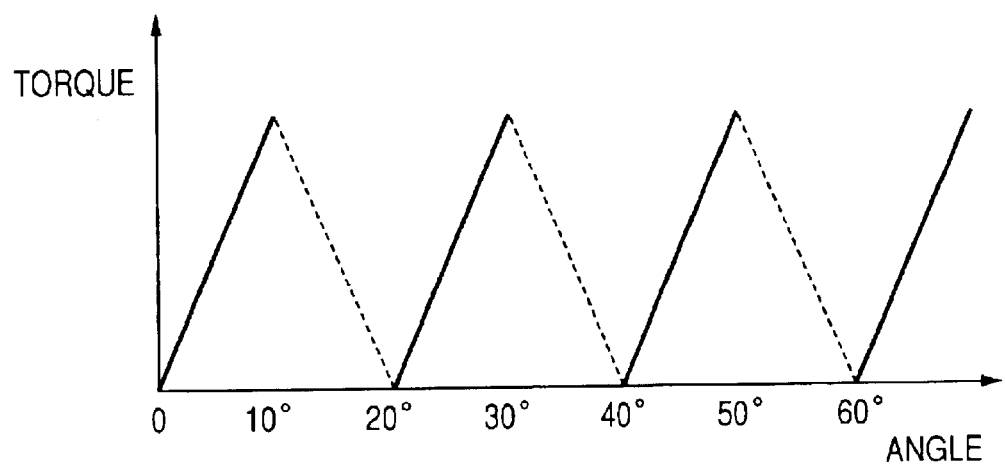
FIG. 2 is a figure showing a relationship between a rotation angle of a rotary knob provided in the present embodiment and a torque provided to the rotary knob.
Figure 3:
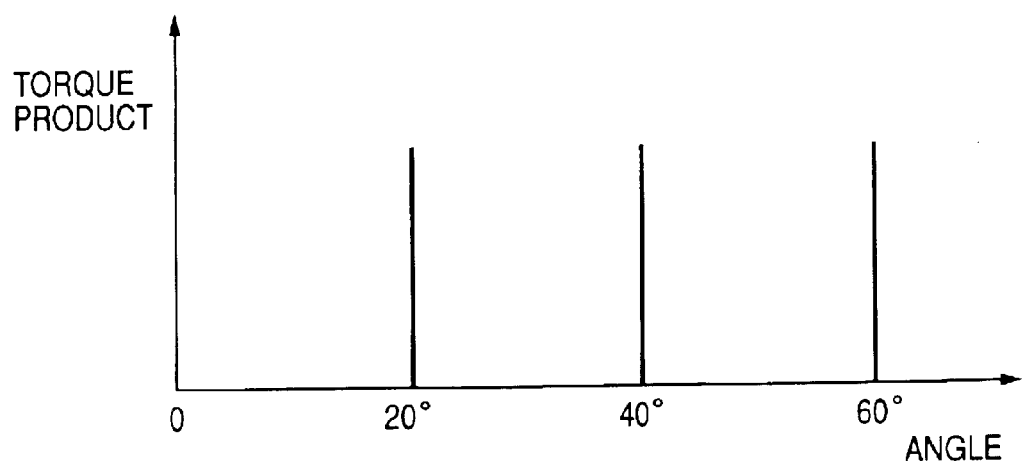
FIG. 3 is a figure showing a relationship between a rotation angle of a rotary knob provided in the present embodiment and a torque product provided to the rotary knob.

FIG. 1 is a diagram showing a configuration of the present embodiment. FIG. 2 is a figure showing a relationship between a rotation angle of rotary knob provided in the embodiment and a torque delivered to the rotary knob. FIG. 3 is a figure showing a relationship between a rotation angle of the rotary knob provided in the embodiment and a torque product provided to the rotary knob.

The present embodiment has an operating member to be manually rotated, i.e. rotary knob 1, a power-operated actuator for delivering torque to the rotary knob 1, a motor 2 having an output shaft the rotary knob 1 for example is fixed, rotation-angle detecting means 3 such as an encoder or potentiometer to detect a rotation angle of the rotary knob 1, operating-velocity detecting means for detecting an angular velocity during operating the rotary knob 1, and control means for controlling the motor 2 according to a rotation angle of the rotary knob 1 detected by the rotation-angle detecting means 3 and an angular velocity detected by the operating-velocity detecting means, i.e. CPU 4.

The CPU 4 has a torque arithmetic operating section 4d for arithmetically operating a torque to be delivered to the rotary knob 1 on the basis of a rotation angle detected by the rotation-angle detecting means 3 and outputting a control signal to control the motor 2 depending upon the torque.

The torque arithmetic operating section 4d is set, as shown by the broken line in FIG. 2, such that, while the rotary knob 1 rotates from a predetermined first angle to a predetermined third angle beyond a predetermined second angle, e.g., while the rotary knob 1 rotates from 10° to 30° beyond 20°, when the rotary knob 1 is within a range of rotation angle of from 10° to 20°, a torque in the same direction as the rotating direction of the rotary knob 1 is delivered from the motor 2 to the rotary knob 1 and decreased from a maximum value to zero with an increase of rotation angle of the rotary knob 1. Incidentally, the torque maximum value to be provided to the rotary knob 1 is previously set depending upon the performance of the motor 2.

Meanwhile, the torque arithmetic operating section 4d is set, as shown by the solid line in the same FIG. 2, such that, while the rotary knob 1 rotates from 10° to 30° as mentioned above, when the rotary knob 1 is within a range of rotation angle of from 20° to 30°, a torque in the reverse direction to the rotating direction of the rotary knob 1 is delivered from the motor 2 to the rotary knob 1 and increased from zero to a maximum value with an increase of rotation angle of the rotary knob 1.

Meanwhile, the torque arithmetic operating section 1d is set such that, while the rotary knob 1 rotates from 30° to 50°, from 50° to 70°, from 70° to 90°, . . . or from 350° to 370° (10°), control is effected similarly to the control of the motor 2 of during the foregoing rotation of 10° to 30°.

Incidentally, in FIG. 2, the magnitude of a torque in the same direction as the rotating direction of the rotary knob 1 is shown by the broken line while the magnitude of a torque in the reverse direction to the rotating direction of the rotary knob 1 is shown by the solid line. Namely, in FIG. 2, torque change is represented by an absolute value.

Meanwhile, the CPU 4 has an operating-velocity arithmetic operating section 4a for arithmetically operating an angular velocity of the rotary knob 1 depending upon a change rate of rotation angle of rotary knob 1 detected by the rotation-angle detecting means 3. Namely, the operating-velocity detecting means is formed by the rotation-angle detecting means 3 and the operating-velocity arithmetic operating section 4a.

Meanwhile, the CPU 4 has a torque-product arithmetic operating section 4b that arithmetically operates a torque product to be provided to the rotary knob 1 each time the rotary knob 1 reaches 20°, 40°, 60° . . . 360°, depending upon an angular velocity of the rotary knob 1 calculated by the operating-velocity arithmetic operating section 4a. The torque-product arithmetic operating section 4b is set to calculate a torque product on the basis of a product of an angular velocity calculated by the operating-velocity arithmetic operating section 4a and a preset proportional multiplier.

Meanwhile, the CPU 4 has the proportional multiplier and the upper limit value of torque in providing a torque product to the rotary knob 1, which are configured adjustable by not-shown input means.

Meanwhile, the torque arithmetic operating section 4d is set to control the motor 2 depending upon the torque product calculated by the torque-product arithmetic operating section 4b when the rotary knob 1 is detected rotated 20°, 40°, 60° . . . 360°. Incidentally, because the time required for controlling the motor 2 is determined by a process speed of the CPU 4, the torque arithmetic operating section 4d is set to arithmetically operate a magnitude of torque of upon providing a torque product to the rotary knob 1 and a time for which the torque is provided to the rotary knob 1, on the basis of a time required for once controlling the motor 2 as a unit time. Incidentally, the time information corresponding to the unit time is to be transferred from a timer 4c provided in the CPU 4 to the torque arithmetic operating section 4d.

Figure 4:
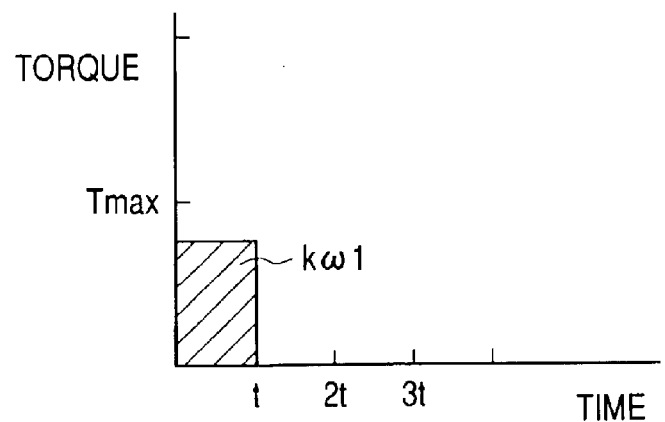
FIG. 4 is a figure showing one example on a relationship between a torque product provided to the rotary knob provided in the present embodiment and a torque and time configuring the torque product.
Figure 5:
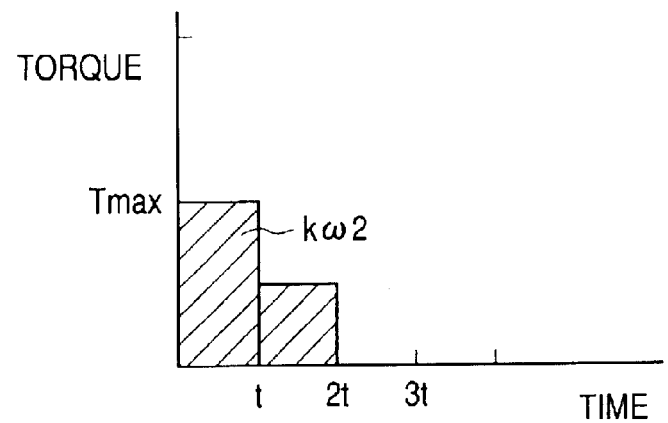
FIG. 5 is a figure showing another example on a relationship between a torque product provided to the rotary knob provided in the present embodiment and a torque and time configuring the torque product.
Figure 6:
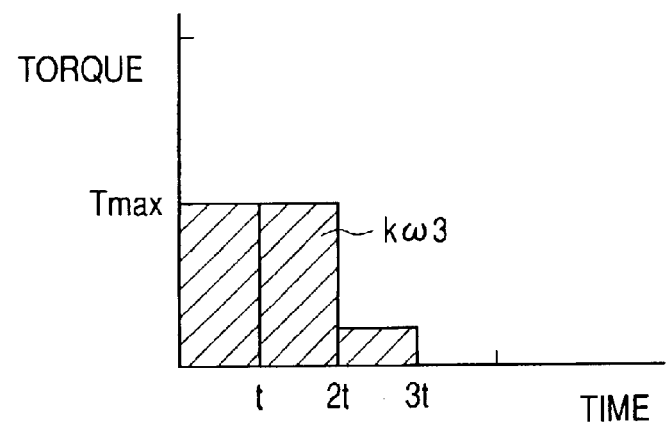
FIG. 6 is a figure showing still another example on a relationship between a torque product provided to the rotary knob provided in the present embodiment and a torque and time configuring the torque product.

Herein, explanation is made as to in what way the torque of upon providing a torque product to the rotary knob 1 and the time for which the torque is provided to the rotary knob 1 are set on the basis of a torque product arithmetically operated by the torque-product arithmetic operating section 4b, by using FIGS. 4 to 6.

FIGS. 4 to 6 are figures showing an example on a relationship between a torque product provided to the rotary knob 1 and a torque and time constituting the torque product. In these FIGS. 4 to 6, a proportional multiplier is designated as k, an angular velocity is designated $\omega$, a torque upper limit value is designated as Tmax and a unit time is designated as t. The torque product k$\omega$ is an area of the hatched part shown in FIG. 4.

When $\omega=\omega 1$ and $k\omega 1 \leq Tmax \cdot t$, $k\omega 1=T1 \cdot t$ and T1<Tmax result as shown for example in FIG. 4. When providing a torque product k$\omega$ to the rotary knob 1, a torque having a value T1 is provided to the rotary knob 1 for a time t.

Meanwhile, when $\omega 1<\omega 2$ and $k\omega 2>Tmax \cdot t$, $k\omega 2=(Tmax \cdot t)+(T2 \cdot t)$ and T2$\leq$Tmax result as shown for example in FIG. 5. When providing a torque product k$\omega$ to the rotary knob 1, a torque having a value Tmax is provided to the rotary knob 1 for a time t. Thereafter, a torque having a value T2 is provided to the rotary knob 1 for a time t.

Meanwhile, when $\omega 2<\omega 3$, $k\omega 3=(Tmax \cdot t)+(Tmax \cdot t)+(T3 \cdot t)$ and T3$\leq$Tmax result as shown for example in FIG. 6. When providing a torque product k$\omega$ to the rotary knob 1, a torque having a value Tmax is provided to the rotary knob 1 for a time 2 t. Thereafter, a torque having a value T3 is provided to the rotary knob 1 for a time t.

Figure 7:
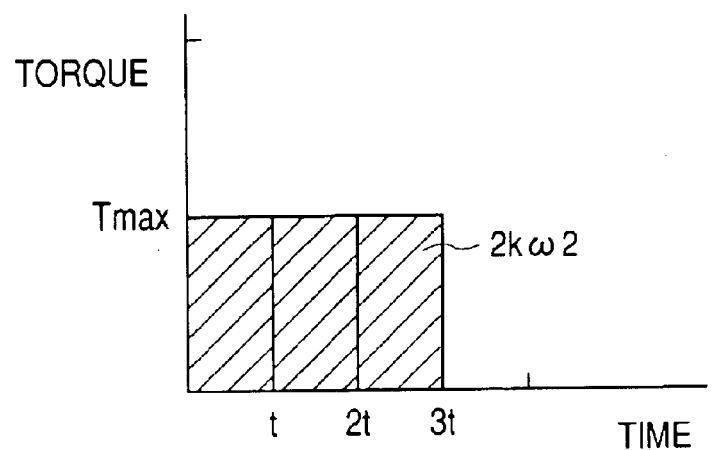
FIG. 7 is a figure showing one example on a relationship between a torque product and a torque and time configuring the torque product in the case of setting great a proportional multiplier for calculating a torque product to be provided to the rotary knob provided in the present embodiment.
Figure 8:
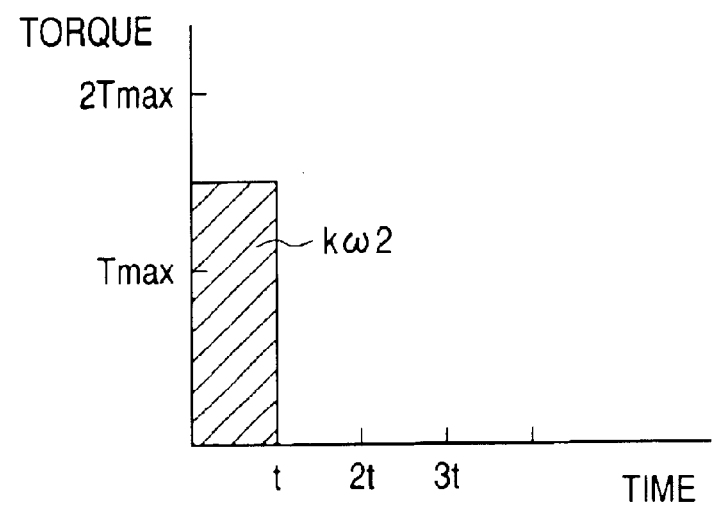
FIG. 8 is a figure showing one example on a relationship between a torque product and a torque and time configuring the torque product in the case of setting great an upper limit value of torque when providing a torque product to the rotary knob provided in the present embodiment.

Next, explanation is made as to in what way the torque product to be provided to the rotary knob 1 is changed (1) in the case of setting the proportional multiplier great and (2) in the case of setting the upper limit value of motor output torque great, by using FIGS. 7 and 8.

FIG. 7 is a figure showing one example on a relationship between a torque product and a torque and time constituting the torque product where the proportional multiplier for calculating a torque product to be provided to the rotary knob 1 is set greater. FIG. 8 is a figure showing one example on a relationship between a torque product and a torque and time constituting the torque product where setting great the upper limit value of torque of upon providing a torque product to the rotary knob 1.

(1) In the Case of Setting the Proportional Multiplier Great

For example, the upper limit value of torque is maintained at the foregoing Tmax, to increase the proportional multiplier, e.g. to 2 k that is twice the foregoing. It is assumed that the rotary knob 1 is operated at an angular velocity $\omega=\omega 2$ similarly to the case in FIG. 5. In this case, the torque product to be provided to the rotary knob 1 is 2 k$\omega$2 that is twice the case of FIG. 5, as shown in FIG. 7. Because the upper limit value of torque remains at Tmax, increased is the time for which torque is provided to the rotary knob 1.

(2) In the Case of Setting the Upper Limit Value of Motor Output Torque Great

For example, the proportional multiplier is maintained at k, to increase the upper limit value of torque, e.g. to 2 Tmax that is twice the foregoing. It is assumed that the rotary knob 1 is operated at an angular velocity $\omega=\omega 2$ similarly to the case of FIG. 5. In this case, as shown in FIG. 8, because the proportional multiplier remains at k, the torque product is k$\omega$2 that is the same as the case of FIG. 5. However, because the upper limit value of torque is twice, i.e., 2 Tmax, a torque product in the same magnitude is provided to the rotary knob 1 for a time shorter than the case of FIG. 5.

The present embodiment thus configured operates as in the following.

For example, it is assumed that the operator grips the rotary knob 1 and rotates it from 10° to 30° shown in FIGS. 2 and 3. During rotation of the rotary knob 1, the rotation angle of the rotary knob 1 is continuously detected by the rotation-angle detecting means 3, to output a signal corresponding to a detected rotation angle to the torque arithmetic operating section 4d and operating-velocity arithmetic operating section 4a of the CPU 4.

While the rotary knob 1 rotates from 10° to 20°, the rotary knob 1 is supplied by a torque in the same direction as the rotational direction of the rotary knob 1 under control of the motor 2 by the torque arithmetic operating section 4d. This torque decreases from the maximum value to zero with an increasing in rotation angle of the rotary knob 1. Due to this, the operator has a feel that an urging force is delivered to the rotary knob 1 while rotating the rotary knob 1 from 10° to 20° whereby the urging force gradually decreases with rotation of the rotary knob 1.

When the rotation-angle detecting means 3 detects that the rotation angle of the rotary knob 1 reaches 20°, the operating-velocity arithmetic operating section 4a arithmetically operates an angular velocity of the rotary knob 1 at this time on the basis of a rotation angle of rotary knob 1 detected by the rotation-angle detecting means 3.

Then, the torque-product arithmetic operating section 4b arithmetically operates a torque product depending upon an angular velocity of rotary knob 1 calculated by the operating-velocity arithmetic operating section 4a.

Then, the torque arithmetic operating section 4d arithmetically operates a torque to be provided to the rotary knob 1 and a time for providing the torque to the rotary knob 1, on the basis of a torque product calculated by the torque-product arithmetic operating section 4b and time information to be transferred by the timer 4c, i.e. unit time. Depending upon a result of the calculation, the motor 2 is controlled. Due to this, a torque product is provided from the motor 2 to the rotary knob 1. Accordingly, the operator obtains an impact from the rotary knob 1 when the rotation angle of the rotary knob 1 reaches 20°.

During rotation of the rotary knob 1 from 20° to 30°, a torque in a reverse direction to the rotating direction of the rotary knob 1 is provided from the motor 2 to the rotary knob 1, under control of the motor 2 by the torque arithmetic operating section 4d. This torque increases from zero to a maximum value with an increase in rotation angle of the rotary knob 1. Due to this, the operator has a feel that a resistance force is caused on the rotary knob 1 during rotation of the rotary knob 1 from 20° to 30° whereby the resistance force gradually increases as the rotary knob 1 is rotated.

Incidentally, this embodiment operates similarly in the case that the operator rotates the rotary knob 1 from 30° to 50° shown in FIGS. 2 and 3, from 50° to 70°, from 70° to 80° ... or from 350° to 370° (10°).

The present embodiment obtains the following effect.

In the present embodiment, under electric control of the motor 2 by the CPU 4, a feel similar to that of a click mechanism is to be generated at around the time that the rotation angle of the rotary knob 1 reaches 20°, 40°, 60°, 80° ... 360°. In addition, when the rotary knob 1 reaches a second angle, an impact similar to that of a click mechanism can be generated, thus making it possible to generate a click feel similar to a click feel to be obtained by a click mechanism. This can generate a clear click feel.

Meanwhile, in the present embodiment, because the proportional multiplier for arithmetically operating a torque product and the torque upper limit value of upon providing a torque product to the rotary knob 1 are each adjustable, click feel can be changed. This can set a click feel meeting the operator's preference.

Incidentally, although in the present embodiment the operating member was the rotary knob 1, the invention is not limited to that, i.e. it maybe a manipulating lever to be manually rotated.

Meanwhile, although in the present embodiment the power-operated actuator was the motor 2, the invention is not limited to that, i.e. it is satisfactorily a power-operated actuator capable of providing a torque.

Meanwhile, although in the present embodiment the operating member was the rotary knob 1 to be manually rotated, the invention is not limited to that. Namely, in the case to structure an inner-force providing input device having a operating member to be operated straight-line, it maybe structured to provide force, in place of torque, to the operating member and impulse in place of torque product. Due to this, even in case the operating member is to be operated straight-line, a clear click feel can be provided under electric control to the operator.

As described in the above, in the present invention, under electric control of the power-operated actuator, a feel similar to that of a click mechanism is generated at around the time that the rotation angle of the operating member reaching the second angle. In addition, when the operating member reaches the second angle, an impact similar to that of a click mechanism is generated, thus making it possible to generate a click feel similar to that of a click mechanism. Due to this, a clear click feel can be generated.

Meanwhile, in the invention, in case the control means includes a torque product arithmetic operating section for arithmetically operating the torque product according to a product of the angular velocity arithmetically operated by the operation-velocity arithmetic operating section and a preset proportional multiplier, wherein the torque product is configured to adjust an upper limit value of torque of upon providing the torque product to the operating member and the proportional multiplier, the click feel can be changed. This can make it possible to set a click feel meeting the operator's preference.

Meanwhile, the inner-force providing input device has the operating member to be manually rotated. In the case to configure an inner-force providing input device having an operating member to be operated straight-line manually, it is satisfactory to configure such that a force in place of a torque and an impulse in place of a torque product are provided to the operating member. Due to this, even in case the operating member is to be operated straight-line manually, a click feel similar to that of click mechanism can be generated under electric control. This can generate a clear click feel.

What is claimed is:

1. An inner-force providing input device comprising:
   an operating member to be manually rotated;
   a power-operated actuator for providing a torque to the operating member;
   rotation angle detecting means for detecting a rotation angle of the operating member;
   operating velocity detecting means for detecting an angular velocity of the operating member; and
   control means for controlling the power-operated actuator depending upon an rotation angle detected by the rotation angle detecting means and an angular velocity detected by the operating velocity detecting means;
   the control means being set such that, while the operating member rotates from a predetermined first angle to a predetermined third angle beyond a predetermined second angle, when the operating member is within a range of from the first angle to the second angle, a torque in a same direction as a rotating direction of the operating member is provided from the power-operated actuator to the operating member and decreased with increasing rotation angle of the operating member,
   when the operating member reaches the second angle, a torque product based on the angular velocity of the operating member detected by the operating velocity detecting means is provided from the power-operated actuator to the operating member, and
   when the operating member is within a range of from the second angle to the third angle, a torque in a reverse direction to the rotating direction of the operating member is provided from the power-operated actuator to the operating member and increased with increasing rotation angle of the operating member.

2. An inner-force providing input device according to claim 1, wherein the operating velocity detecting means comprises the rotation angle detecting means and an operating velocity arithmetic operating section for arithmetically operating an angular velocity of the operating member on the basis of a rotation angle change of the operating member detected by the rotation angle detecting means, the operating velocity arithmetic operating section being included in the control means.

3. An inner-force providing input device according to claim 2, wherein the control means includes a torque product arithmetic operating section for arithmetically operating the torque product according to a product of the angular velocity arithmetically operated by the operation velocity arithmetic-operating section and a preset proportional multiplier, to adjustably configure an upper limit value of torque of upon providing the torque product to the operating member and the proportional multiplier.

4. An inner-force providing input device comprising:
   an operating member to be manually operated straight-line;
   a power-operated actuator for providing a force to the operating member;
   position detecting means for detecting a position of the operating member;
   operating velocity detecting means for detecting a moving velocity of the operating member; and control means for controlling the power-operated actuator depending upon a position detected by the position detecting means and a moving velocity detected by the operating velocity detecting means;

the control means being set such that, while the operating member moves from a predetermined first position to a predetermined third position beyond a predetermined second position, when the operating member is within a range of from the first position to the second position, a force in a same direction as a moving direction of the operating member is provided from the power-operated actuator to the operating member and decreased with increasing moving distance of the operating member, when the operating member reaches the second position, an impulse based on the moving velocity of the operating member detected by the operating velocity detecting means is provided from the power-operated actuator to the operating member, and when the operating member is within a range of from the second position to the third position, a force in a reverse direction to the moving direction of the operating member is provided from the power-operated actuator to the operating member and increased with an increasing moving distance of the operating member.

* * * * *